US012368749B2

(12) United States Patent
Rao et al.

(10) Patent No.: US 12,368,749 B2
(45) Date of Patent: *Jul. 22, 2025

(54) SECURE NEIGHBORHOODS ASSESSMENT IN ENTERPRISE NETWORKS

(71) Applicant: Cisco Technology, Inc., San Jose, CA (US)

(72) Inventors: Supreeth Rao, Cupertino, CA (US); Navindra Yadav, Cupertino, CA (US); Prasannakumar Jobigenahally Malleshaiah, Sunnyvale, CA (US); Hanlin He, San Jose, CA (US); Umamaheswaran Arumugam, San Jose, CA (US); Robert Bukofser, Mason, OH (US); Aiyesha Ma, San Francisco, CA (US); Kai Zhu, San Jose, CA (US); Ashok Kumar, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,036

(22) Filed: Jul. 13, 2023

(65) Prior Publication Data

US 2023/0370489 A1 Nov. 16, 2023

Related U.S. Application Data

(63) Continuation of application No. 16/990,664, filed on Aug. 11, 2020, now Pat. No. 11,716,343.

(51) Int. Cl.
*H04L 9/40* (2022.01)
*G06F 16/901* (2019.01)
(Continued)

(52) U.S. Cl.
CPC ...... *H04L 63/1433* (2013.01); *G06F 16/9024* (2019.01); *G06F 16/9035* (2019.01); *H04L 41/22* (2013.01); *H04L 63/1425* (2013.01)

(58) Field of Classification Search
CPC . H04L 63/1433; H04L 41/22; H04L 63/1425; G06F 16/9024; G06F 16/9035
See application file for complete search history.

(56) References Cited

U.S. PATENT DOCUMENTS 7,890,869 B1 2/2011 Mayer et al.
9,098,815 B2 8/2015 Li et al.
(Continued)

FOREIGN PATENT DOCUMENTS

JP 6016982 B1 10/2016
WO 03060717 A1 7/2003

OTHER PUBLICATIONS

Angelini M., et al., "VULNUS: Visual Vulnerability Analysis For Network Security," Research Gate, Aug. 2018, 11 pages.
(Continued)

*Primary Examiner* — Beemnet W Dada
(74) *Attorney, Agent, or Firm* — Polsinelli P.C.

(57) ABSTRACT

Systems, methods, and computer-readable media for determine a neighborhood graph can include the following processes. A neighborhood graph system generates a neighborhood graph for a plurality of nodes in an enterprise network, the neighborhood graph representing a multi-hop connections between any two nodes of the plurality of nodes. A security score service determines a security score for each of the plurality of nodes to yield a plurality of scores. The neighborhood graph system updates the neighborhood graph of the plurality of nodes using the plurality of scores to provide a visual representation of securities of the plurality of nodes relative to each other.

20 Claims, 10 Drawing Sheets

(51) Int. Cl.
  *G06F 16/9035* (2019.01)
  *H04L 41/22* (2022.01)

(56) References Cited

U.S. PATENT DOCUMENTS

| | | | |
|---|---|---|---|
| 10,193,901 | B2 | 1/2019 | Muddu et al. |
| 10,284,589 | B2 | 5/2019 | Hamdi |
| 11,201,890 | B1 * | 12/2021 | Coull .................. G06F 16/9024 |
| 2016/0241561 | A1 | 8/2016 | Bubany et al. |
| 2018/0219888 | A1 | 8/2018 | Apostolopoulos |
| 2019/0379700 | A1 * | 12/2019 | Canzanese, Jr. ..... G06F 16/9024 |
| 2021/0157851 | A1 | 5/2021 | Aoyama et al. |
| 2021/0248449 | A1 | 8/2021 | Sun et al. |
| 2021/0406312 | A1 | 12/2021 | Iwasaki |

OTHER PUBLICATIONS

International Search Report and Written Opinion for International Application No. PCT/US2021/042981, mailed Oct. 18, 2021, 10 Pages.

* cited by examiner

SECURE NEIGHBORHOODS ASSESSMENT IN ENTERPRISE NETWORKS

CROSS-REFERENCE TO RELATED APPLICATION

This application is a continuation of U.S. patent application Ser. No. 16/990,664 filed on Aug. 11, 2020, the contents of which is incorporated by reference in its entirety.

TECHNICAL FIELD

The subject matter of this disclosure relates in general to the field of secure neighborhoods assessment for nodes in enterprise networks, and more specifically to providing a visual representation of securities of network nodes relative to each other, based on the relationships between the nodes and the security score for each nodes.

BACKGROUND

An enterprise application is a set of workloads (e.g., computing, networking, and storage) that are generally distributed and executed across various nodes (or hosts) of a network. Providing a straightforward visual representation of the relationships between the network nodes and the securities of the nodes relative to each other is critical for a system operator to quickly and efficiently identify security issues in the enterprise network. However, network monitoring systems currently lack any capability to provide a comprehensive and visual representation of security status of network nodes.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
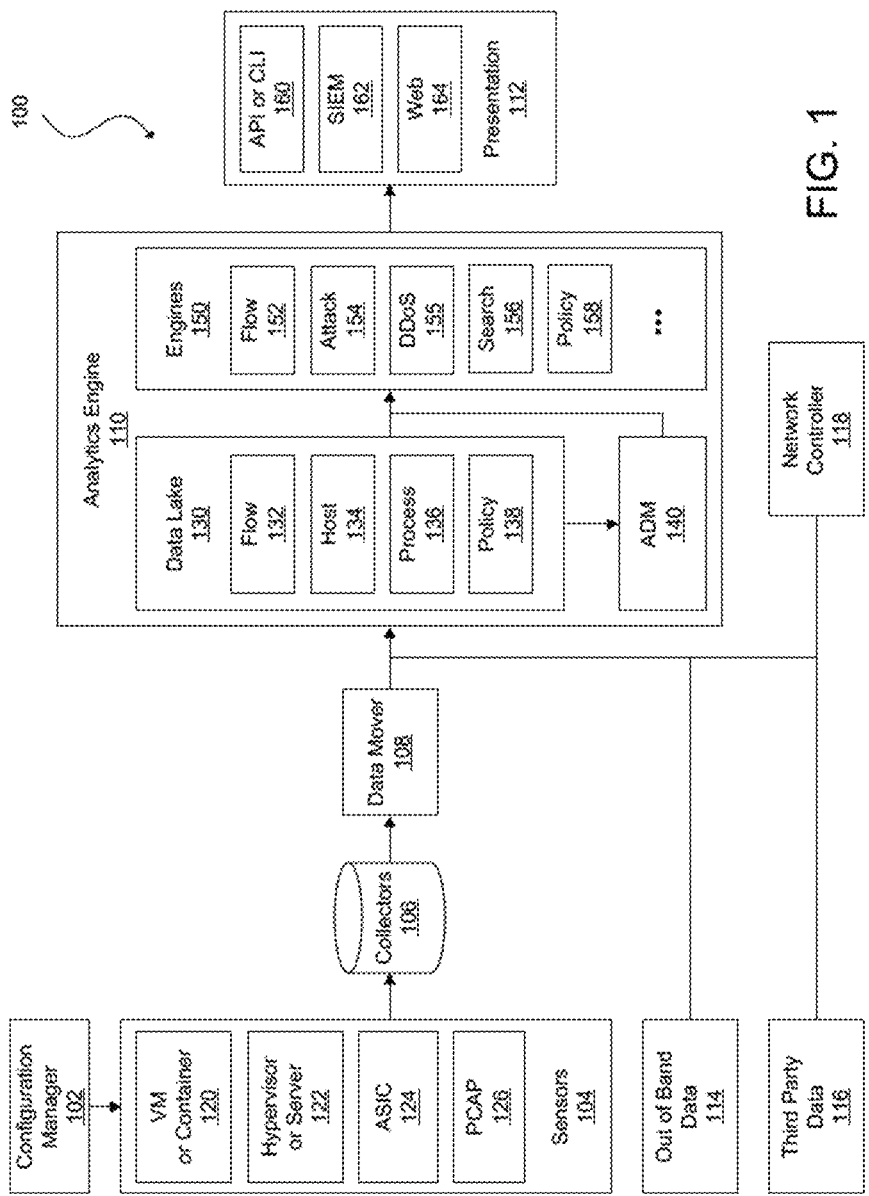
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the subject technology relate to providing a visual representation of securities of network nodes relative to each other (network neighborhood security), based on the relationships between the nodes and the security score for each node.

In one aspect, a method includes, generating a neighborhood graph for a plurality of nodes in an enterprise network, the neighborhood graph representing a multi-hop connections between any two nodes of the plurality of nodes; determining a security score for each of the plurality of nodes to yield a plurality of scores; and updating the neighborhood graph of the plurality of nodes using the plurality of scores to provide a visual representation of securities of the plurality of nodes relative to each other.

In another aspect, the method further includes filtering the updated neighborhood graph.

In another aspect, the filtering is based on a filtering parameter associated with at least one of a number of source nodes and a number of destination nodes in the enterprise network.

In another aspect, the filtering parameter includes a threshold attack surface score of each of the number of source nodes, a threshold attack surface score of each of the number of destination nodes, a vulnerability score of each of the number of source nodes, or a vulnerability score of each of the number of destination nodes.

In another aspect, the method further includes receiving a request for generating the neighborhood graph.

In another aspect, the method further includes creating an alert for the updated neighborhood graph, the alert indicating presence of one or more new network connections between the plurality of nodes having a threshold security score.

In another aspect, the node is a scope, a cluster or an inventory filter.

In one aspect, a secure neighborhood assessment system includes: one or more processors; and at least one computer-readable storage medium having stored therein instructions which, when executed by the one or more processors, cause the one or more processors to: generate a neighborhood graph for a plurality of nodes in an enterprise network, the neighborhood graph representing a multi-hop connections between any two nodes of the plurality of nodes; determine a security score for each of the plurality of nodes to yield a plurality of scores; and update the neighborhood graph of the plurality of nodes using the plurality of scores to provide a visual representation of securities of the plurality of nodes relative to each other.

In one aspect, a non-transitory computer-readable storage medium including instructions which, when executed by one or more processors of secure neighborhood assessment system, cause the application placement system to: generate a neighborhood graph for a plurality of nodes in an enterprise network, the neighborhood graph representing a multi-hop connections between any two nodes of the plurality of nodes; determine a security score for each of the plurality of nodes to yield a plurality of scores; and update the neighborhood graph of the plurality of nodes using the plurality of scores to provide a visual representation of securities of the plurality of nodes relative to each other.

DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

As used herein the term "neighborhood," may refer to a group of network nodes (or simply nodes) within an enterprise network. Such a group of nodes can be composed by the system and method described below. Specifically, a user or a system can define a node to be in the same neighborhood as another node if the number of network connections, i.e. hops, between the node and the other node equals or is less than a set number, such as one, two, etc. A given node can have two different neighborhoods for inbound traffic or outbound traffic. For example, node A can be an inbound neighbor of node B but not an outbound neighbor of node B. Because there is only a single hop between nodes A and B for inbound traffic. Whereas there is more than a set number of hops between nodes A and B for outbound traffic.

The current network security system offers isolated security assessment data about an enterprise network, such as the security assessment of each node. To identify security issues in an enterprise network based on such isolated existing data, a system operator needs to compare each set of isolated security data to be able to draw conclusions on security status of network nodes. Thus, such a security assessment approach is inefficient, incomplete and inconvenient.

The disclosed technology improves the security assessment in an enterprise network. One example improvement provided here is an aggregated visual representation of the neighborhood of a given node within an enterprise network. Specifically, the visual representation shows either inbound or outbound traffic of the neighborhood overview based on the network connection relationships between each node. Moreover, the visual representation also presents the securities of the nodes relative to each other. Thus, it is straightforward for system operators to identify security issues related to a given node. Another example improvement provided here is the filtered visual representation of connections associated with at least one source node and at least one destination node. Specifically, this more detailed visual representation and the additional security data of such connections can help a system operator to quickly focus on a more detailed portion of the neighborhood and come up with conclusions about the neighborhood security more efficiently.

The disclosure begins with a description of examples of the network monitoring system and example network environment in which concepts of application placement, as mentioned above, may be deployed.

Referring now to the drawings, FIG. 1 illustrates an example of a network traffic monitoring system, according to one aspect of the present disclosure. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Maryland. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, California, Arbor Networks® of Burlington, Massachusetts, Symantec® Corp. of Sunnyvale, California, Sophos® Group plc of Abingdon, England, Microsoft® Corp. of Seattle, Washington, Verizon® Communications, Inc. of New York, New York, among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geo-coordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, California, as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, California as the STEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, New York and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
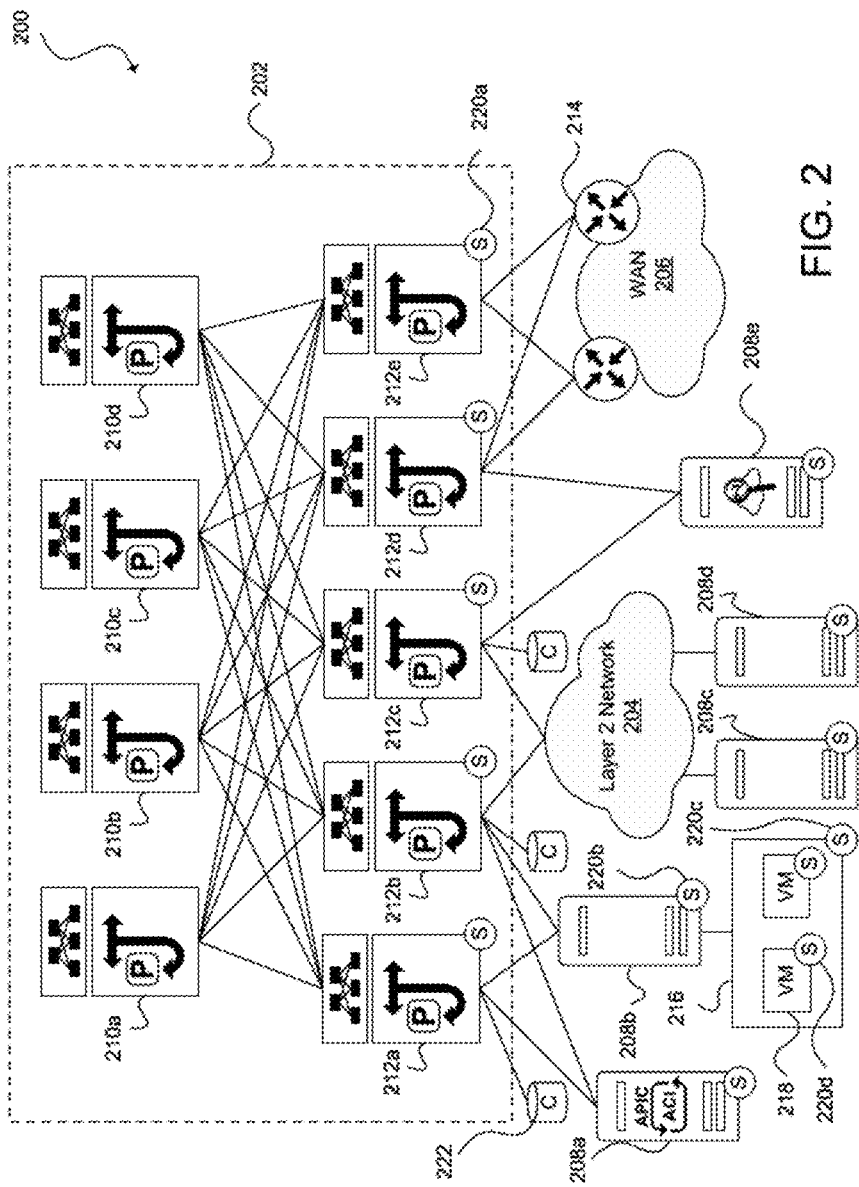
FIG. 2 illustrates an example of a network environment, according to one aspect of the present disclosure.

FIG. 2 illustrates an example of a network environment, according to one aspect of the present disclosure. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208*a*, 208*b*, 208*c*, 208*d*, and 208*e* (collectively, 208). The network fabric 202 can include spine switches 210*a*, 210*b*, 210*c*, and 210*d* (collectively, "210") and leaf switches 212*a*, 212*b*, 212*c*, 212*d*, and 212*e* (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212*d* and 212*e* operate as border leaf switches in communication with edge devices 214 located in the external network 206. The border leaf switches 212*d* and 212*e* may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

With examples of a monitoring system and a networking environment described above with reference to FIGS. 1 and 2, the disclosure now turns to examples of secure neighborhood assessment systems that can be implemented via, for example, analytics engine 110 of FIG. 1, for visually represent a neighborhood of nodes. The visual representation of neighborhood may be generated based on network connection data gathered by network sensors. In one example, the visual representation of neighborhood is generated based on data from ADM module 140 of FIG. 1. The visual representation of neighborhood may also be generated based on the security score and other scores of each node within the enterprise network.

Prior to describing examples of visual representation of neighborhood security within a given enterprise network, the disclosure provides an example of determining/providing an assessment of security of network nodes, which can then be used to generate visual representation of neighborhood security in an enterprise network.

Figure 3:
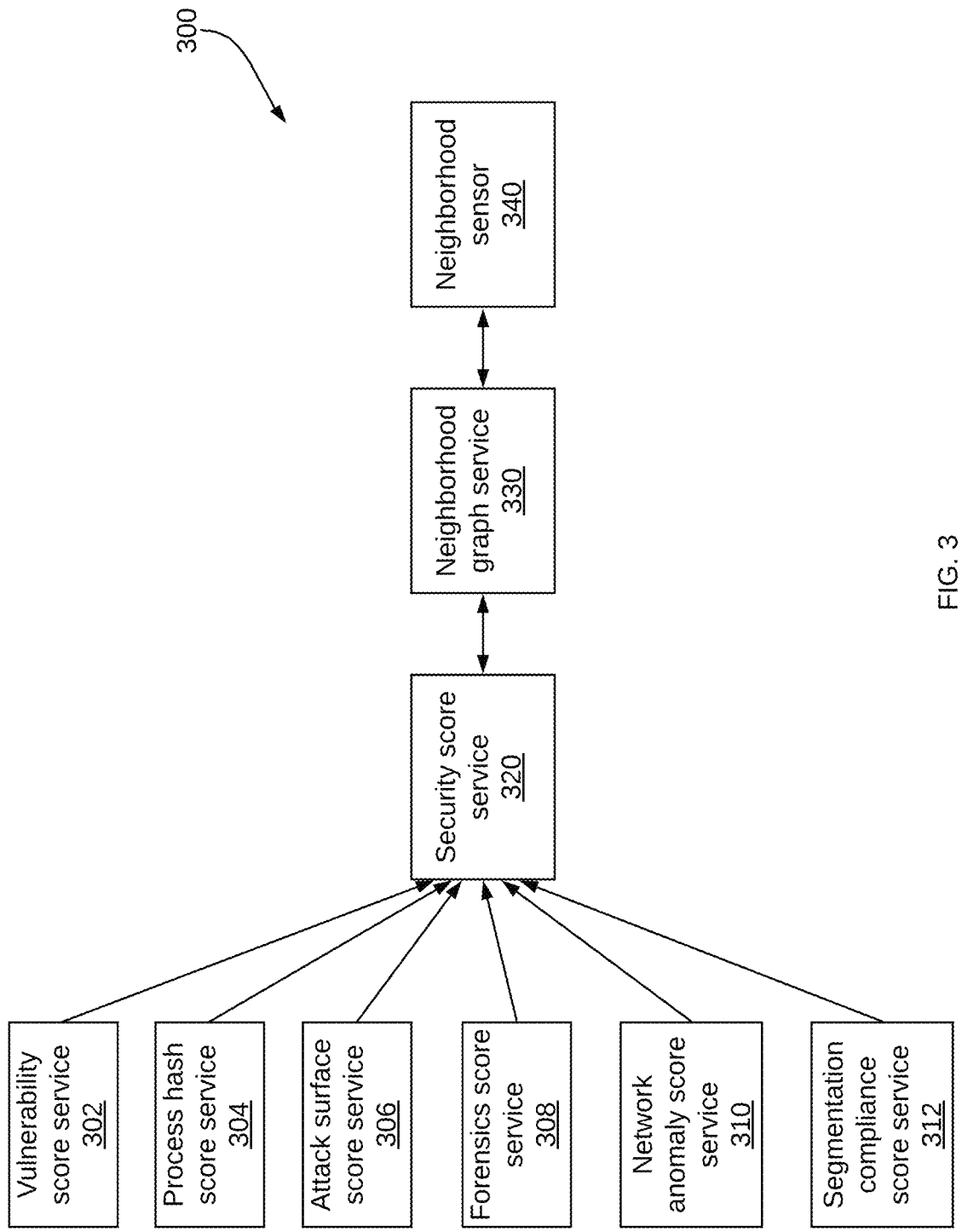
FIG. 3 illustrates an example secure neighborhood assessment system utilizing the neighborhood sensor and the security score of the node, according to one aspect of the present disclosure.

FIG. 3 illustrates an example secure neighborhood assessment system utilizing the neighborhood sensor and the security score of the node, according to one aspect of the present disclosure. The nodes include, but are not limited to, any network node such as a network server, a virtual machine, a container, etc. Each node can also include, but not limited to any scope, cluster, or inventory filter of groups of machines or workloads within an enterprise network. In some examples, the secure neighborhood assessment system 300 can be directed by a network traffic monitoring system, such as the network traffic monitoring system 100 of FIG. 1, an analytics engine, such as the analytics engine 110 of FIG. 1, or other network service or network appliance. For example, an analytics engine 110, an engine 150 or any of engines included therein, can be configured to determine the security score of each node, determine the vulnerability score of each node, determine the process hash score for each node, determine the attack surface score of each node, determine the forensics score of each node, determine the network anomaly score of each node, determine the segmentation compliance score for each node, or generate a neighborhood graph. In some examples, neighborhood sensor 340 can include, but is not limited to sensors 104 and 220, to collect the network connection data of each node.

According to some embodiments, each of the vulnerability score service 302, process hash score service 304, attack surface score service 306, forensics score service 308, network anomaly score service 310, segmentation compliance score service 312, security score service 320, and neighborhood graph service 330 may be a set of computer-readable instructions that can be executed by engines 150 or its components to determine a corresponding score.

The vulnerability score service 302 can determine a vulnerability score of the node or the workloads placed on the node. The workloads placed on the node can be associated with the same or different applications. The vulnerability of the workloads on a node or a node can be determined based on the impact of a known security flaw. For example, known security flaws can be any flaw from the Common Vulnerability and Exposures (CVE), which is a list of publicly disclosed cybersecurity security flaws. In some embodiments, the Common Vulnerability Scoring System (CVSS) score is being utilized to assess such CVE. Specifically, the CVSS score ranges from 0 to 10, and a higher score indicates a more severe vulnerability. In some embodiments, the vulnerability score of the workload can be determined based on CVE of vulnerable software detected on the workload. There are different versions of CVSS score, and the vulnerability score service 302 could be determined based on the most recent version when it is available. For example, when both the CVSS version 2 score and the CVSS version 3 score is available for a CVS, the CVSS version 3 score will be utilized first.

When determining the vulnerability score, the vulnerability score service 302 can also consider other factors such as the vendor data. For example, the vendor data is the CVE data included in the National Institute of Standards and Technology (NIST) National Vulnerability Database (NVD). In some embodiments, the network traffic monitoring system 100 or its system operator can adjust the final vulnerability score when there is an anomaly in the vendor data. For example, for some new vulnerabilities, it is common to have certain vendor data missing or inaccurate, and such adjustment of the final vulnerability score could be performed. In some embodiments, the vendor data of a given vulnerability can be updated periodically, such as every 24 hours.

The vulnerability score service 302 can determine the final vulnerability score utilizing different formulae. In some embodiments, the final vulnerability score is inverse proportional to the severity of the CVSS score of the given vulnerability.

The process hash score service 304 can determine a process hash score for a node. Specifically, the process hash score is an assessment of process binary hash or file hash consistency across workloads placed on a node, or across multiple nodes. For example, all servers of a web server farm funning APACHE cloned form the same setup configuration is expected to have the same hash for httpd binaries, which indicate the process binary hash consistency for the servers is high. On the contrary, one or a few of the servers having different hash for httpd binaries would indicate the process binary hash consistency for the servers is low. In some embodiments, the process hash score is proportional to the process binary hash consistency. In some embodiments, a lower process hash score might indicate that one or more process hashes are being blacklisted or are anomalous.

The attack surface score service 306 can determine an attack surface score for a node or a workload placed on a node. The attack surface score measures the number of potential attack surfaces, such as unused open ports, of a node or a workload placed on a node. Specifically, the attack surface score can be a function of unused open ports relative to total ports of a node or a workload, with a smoothing factor being applied. In this example, open ports without any traffic over the past two weeks are considered "unused open ports." Among the unused open ports, some ports have a higher potential risk of being under attack, such as well-known ports that have been used in past attacks.

In one example, the following formula can be used to determine the attack surface score.

$$\text{Attack surface score} = \frac{\alpha + \sum \text{used open ports}}{\alpha + \sum \text{used open ports} + (\rho * \alpha + \sum \text{unused common attack ports}) + f_v(\text{vulnerability } pkgs)} \quad (1)$$

$$f_v = \max\left(\left\{cve_{score} = \begin{cases} CVSS_{v3}, & v3 \text{ exist} \\ CVSS_{v2}, & v3 \text{ not exist} \end{cases}\right\}\right)$$

In formula (1), a represents a smoothing factor that can be predetermined by the network traffic monitoring system 100 or its system operator; p represents a penalty factor which can also be predetermined by the network traffic monitoring system 100 or its system operator. For example, having well-known ports that have been used in past attacks can add an extra penalty factor to formula (1).

In some embodiments, the attack surface score service 306 can determine an attack surface score for a node by using the average of the attack surface scores of workloads that are placed onto the node. In some embodiments, the attack surface score service 306 can determine the attack surface score based on past data, such as data from the past 2 weeks. In some embodiments, the attack surface score service 306 can determine the attack surface score periodically, such as every day.

The forensics score service 308 can determine a forensics score for a node. The forensics score measures the impact of a security incident. The forensics score service can instruct, or include a set of computer-readable instructions that can be executed by engines 150 or its components, to monitor and alert possible security incidents. Specifically, the monitoring and alerting functions can be executed by the sensors 104 and 220. For example, the sensors 104 and 220 can capture real-time forensic events of the node. For another example, the sensors 104 and 220 can also comply with rules that are predetermined by the network traffic monitoring system 100 or its system operator. Examples of real-time forensic events include executables creating a child process, a privilege escalation (such as a user ID executes a "sudo su" command), and hidden commands in bash_profile or bashrc.

In one example, the following formula can be used to determine the forensics score for the host:

$$\text{forensics score} = \max(0,(100-\Sigma\text{forensics event impact score})) \quad (2)$$

In formula (2), the forensics event impact score can be determined first by the engine 150 or its components. The final forensics score can be an inverse function of the forensics event impact score. In one example, a forensic event can be based on a MITRE ATT&CK Evaluation. The MITRE ATT&CK Evaluation of the host can be scored with a static impact score from 0 to 100.

The network anomaly score service 310 can determine a network anomaly score for a host. The network anomaly score measures the severity of a data leak event happened at the host.

In one example, the following formula can be used to determine the network anomaly score (data leak score):

$$\text{data leak score} = \max(0,(100-\Sigma\text{data leak event severity score})) \quad (3)$$

In formula (3), the network anomaly score is an inverse function of the data leak event severity score, which measures how severe a data leak event is. The data leak event severity score can be determined first by the engine 150 or its components. Specifically, it can be a ratio of total bytes transmitted divided by total bytes received. A lower score might indicate an unusually high amount of data is being transferred out of certain workloads on the host. A lower score might also indicate that the network anomaly forensic rule is incorrect. Network anomaly forensic rules can prohibit anomaly forensic events such as an abnormal amount of traffic flows to a Domain Name Server (DNS), or an abnormal amount of traffic flows to a Network Time Protocol (NTP) server.

The segmentation compliance score service 312 can determine a segmentation compliance score for a node. The segmentation compliance score measures policy violations. Specifically, the segmentation compliance score presents a top-level view of all policy violations and highlights the area having the most violations. The segmentation compliance score can be determined for a primary workspace of the node depending on whether there is a unified security policy being enforced. For example, when there is no unified security policy for the whole primary workspace, the segmentation compliance score can be determined as an average of all compliance scores of each network segment of the node.

In one example, the following formula can be used to determine the segmentation compliance score (compliance score):

$$\text{compliance score} = \left[100 - \frac{100 \times (\text{escaped} + \text{misdropped})}{\text{permitted}}\right] \quad (4)$$

In formula (4), (escaped+misdropped) represents the number of policy violations, such as escaped flows or incorrectly dropped (misdropped) flows. Permitted represents the number of permitted traffic. In the example with no unified security policy for the whole primary workspace, such a formula can be utilized to determine the segmentation compliance score of each network segment. A lower segmentation compliance score can indicate a significant number of policy violations relative to the permitted traffic within the node, or within the network segment. The segmentation compliance score can be 0 when the policy violations are more than the permitted traffic on the node, or within the network segment.

Each of the vulnerability score service 302, process hash score service 304, attack surface score service 306, forensics score service 308, network anomaly score service 310, and segmentation compliance score service 312 can transmit its result to the security score service 320. The security score service 320 can determine an overall security score of a node based on each of the above-described scores that correspond to each of the above services. With such an overall security score for the node, it is more convenient for the network operator to quantify the network security of a node, and it is more convenient to specify the conditions for network security policy decisions. When generating the final security score, the security score service 320 can also take into consideration other factors, such as the specific geo-location information of the node. For example, the security score service 320 can increase the security score for a node that is not located in countries sanctioned under regulations such as Office of Foreign Assets Control (OFAC), EU Embargo, or UN Embargo.

In one example, the following formula can be used to determine the security score of a node:

$$\text{Overall score} = \frac{\sum W_{category} \times \text{Score}_{category}}{\sum W_{category}} \quad (5)$$

In formula (5), Score$_{category}$ represents one of the above described specific scores including the vulnerability score, the process hash score, the attack surface score, the forensics score, the network anomaly score, and the segmentation compliance score. In some embodiments, when any of the above-described scores is non-applicable for a node, that specific score is considered as a 0 when determining the overall security score. W$_{category}$ represents an adjustable weight that is being applied to a corresponding one of the above described specific scores. The weight W$_{category}$ can be adjusted by a system operator.

The neighborhood sensor 340 collects the network connection data of each node. The network connection data of a node includes, but is not limited to total traffic between the node and a neighboring node, how many nodes are connected in between the node and a neighboring node, the latency between the node and a neighboring node, the bandwidth between the node and a neighboring node, and the number of traffic drop between the node and a neighboring node, etc. The network connection data can also include inbound neighborhood data and outbound neighborhood data of the node depending on the direction of the traffic.

The neighborhood graph service 330 can receive the overall security score of a node from the security score service 320, and the network connection data from the neighborhood sensor 340. The neighborhood graph service 330 can generate a neighborhood graph for a node based on the overall security score and the network connection data of the node. The examples of the neighborhood graph will be described in detail with reference to FIGS. 5A, 5C, and 5D below.

With examples of assessing security of network nodes, the disclosure next describes examples for generating visual representation of neighborhood security in the network.

Figure 4:
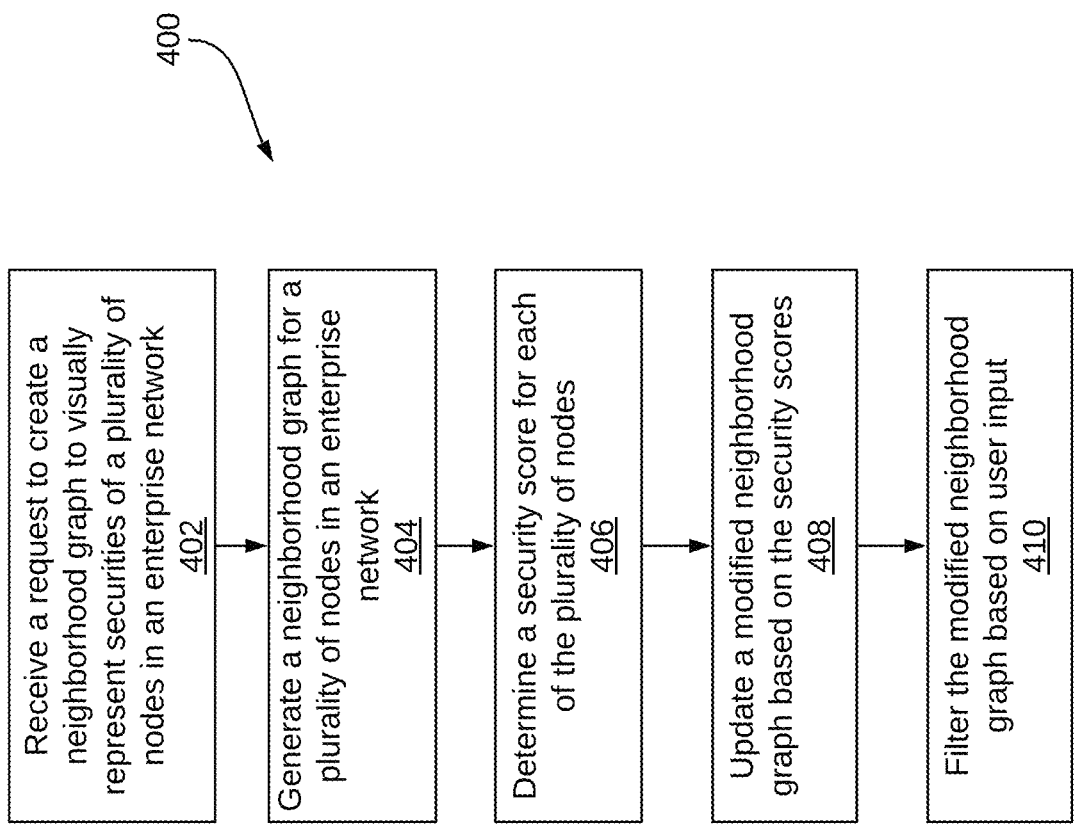
FIG. 4 illustrates an example of a method for determining a neighborhood graph to represent the securities of the nodes, according to one aspect of the present disclosure.

FIG. 4 illustrates an example method for generating a visual representation of neighborhood security in an enterprise network, according to one aspect of the present disclosure. The process of FIG. 4 will be described from the perspective of analytics engine 110 of FIG. 1, implementing functionalities of security score service 320 and neighborhood graph service 330. However, it should be understood that analytics engine 110 may have one or more processors executing computer-readable instructions stored on an associated memory to implement the process 400 of FIG. 4.

At S402, analytics engine 110 may receive a request to create a neighborhood graph to visually represent securities of a plurality of nodes in an enterprise network. Such request can be entered via a user interface, such as API 160, by a system operator. The request may indicate the center node of such a neighborhood graph. In one example, the center node will be presented in the center of the neighborhood graph, and all the other nodes will be presented based on the connection relationship between each of the other nodes and the center node. The request may indicate a desired security factors to be considered to determine the security score of each of the nodes. The request may also indicate the number of hops to be presented between the center node and other nodes.

In another example, the request can also be generated by the analytics engine 110 automatically and periodically. For example, a system operator can set the request for a periodic generation of neighborhood graphs (e.g., once daily, weekly, monthly, etc.) with specifications including desired security factors, number of hops, etc. Accordingly, analytics engine 110 can automatically trigger generation of a neighborhood graph according to the set periodicity.

At S404, analytics engine 110 generates a neighborhood graph for a plurality of nodes in an enterprise network. Analytics engine 110 may generate the neighborhood graph for the center node as indicated in the request at S402, implementing functionalities of neighborhood graph service 330. Such neighborhood graph represents a multi-hop connections between any two nodes of the plurality of nodes. In one example, the neighborhood graph is centered on the center node. An example of such neighborhood graphs will be described in detail with reference to FIGS. 5A, 5C, and 5D below.

At S406, analytics engine 110 determines a security score for each of the plurality of nodes. In one example, analytics engine 110 may implement functionalities of security score service 320 to determine the security score as described with reference to FIG. 3. In one example, this security score can consider different security factors of the node. For example, some of the scores determined by the vulnerability score service 302, process hash score service 304, attack surface score service 306, forensics score service 308, network anomaly score service 310, and segmentation compliance score service 312 can be utilized to determine this security score of the node. For another example, the security score determined by the security score service 320 is based on all the scores determined by the vulnerability score service 302, process hash score service 304, attack surface score service 306, forensics score service 308, network anomaly score service 310, segmentation compliance score service 312, and security score service 320. For yet another example, the security score determined by the security score service 320 can also reflect the specific geo-location risk of the host.

At S408, analytics engine 110 can update the neighborhood graph of the plurality of nodes using the plurality of security scores of the nodes. The updated neighborhood graph provides a visual representation of securities of the plurality of nodes relative to each other. Such an updated neighborhood graph can present security of the neighborhoods in different ways such as using a color coding scheme or any other type of indication that may visually distinguish different neighborhood securities (e.g., different shadings, different visual patterns such as different checkered patterns, etc.). In one example, depending on the desired security factors to be considered to determine the security scores, nodes with security scores higher than a threshold can be presented in blue (or any other visual pattern), while nodes with security scores lower than the threshold can be presented in red (or any other visual pattern that is different that the visual pattern used for nodes with security scores higher than the threshold). In another example, depending on the desired security factors to be considered to determine the security scores, nodes can be presented in various different colors, shadings, patterns, etc., with indicating a range of security scores.

While color coding is one example of visual representation of neighborhood security in an enterprise network, the present disclosure is not limited thereto. Other forms of visual representation are also within the scope of the present disclosure. For example, instead of color coding, numerical scores may be provided on the graph to reflect neighborhood securities. In another example, nodes/neighborhoods with different security scores/assessments may be shown in different sizes (e.g., less secure nodes may be shown to be smaller than more secure nodes, etc.).

At S410, analytics engine 110 can filter the updated neighborhood graph based on an input from a system operator. A system operator may enter any desirable filtering parameter through a user interface, such as API 160. The filtering parameters are designed to help the system operator to narrow down the updated neighborhood graph and focus on a smaller and more detailed portion of the updated neighborhood graph. A system operator can further search within an updated neighborhood graph. This search can narrow down an existing updated neighborhood graph. The detail of the filtering and searching functions will be described with regard to FIG. 5D.

With examples of a network monitoring system, a network environment, a secure neighborhood assessment system, and a method for determining a neighborhood graph to represent the securities of the nodes described with reference to FIGS. 1-4, the disclosure now turns to FIGS. 5A, 5B, 5C, and 5D for description of example neighborhood graph and example user interface to implement other functions of the neighborhood graph.

Figure 5A:
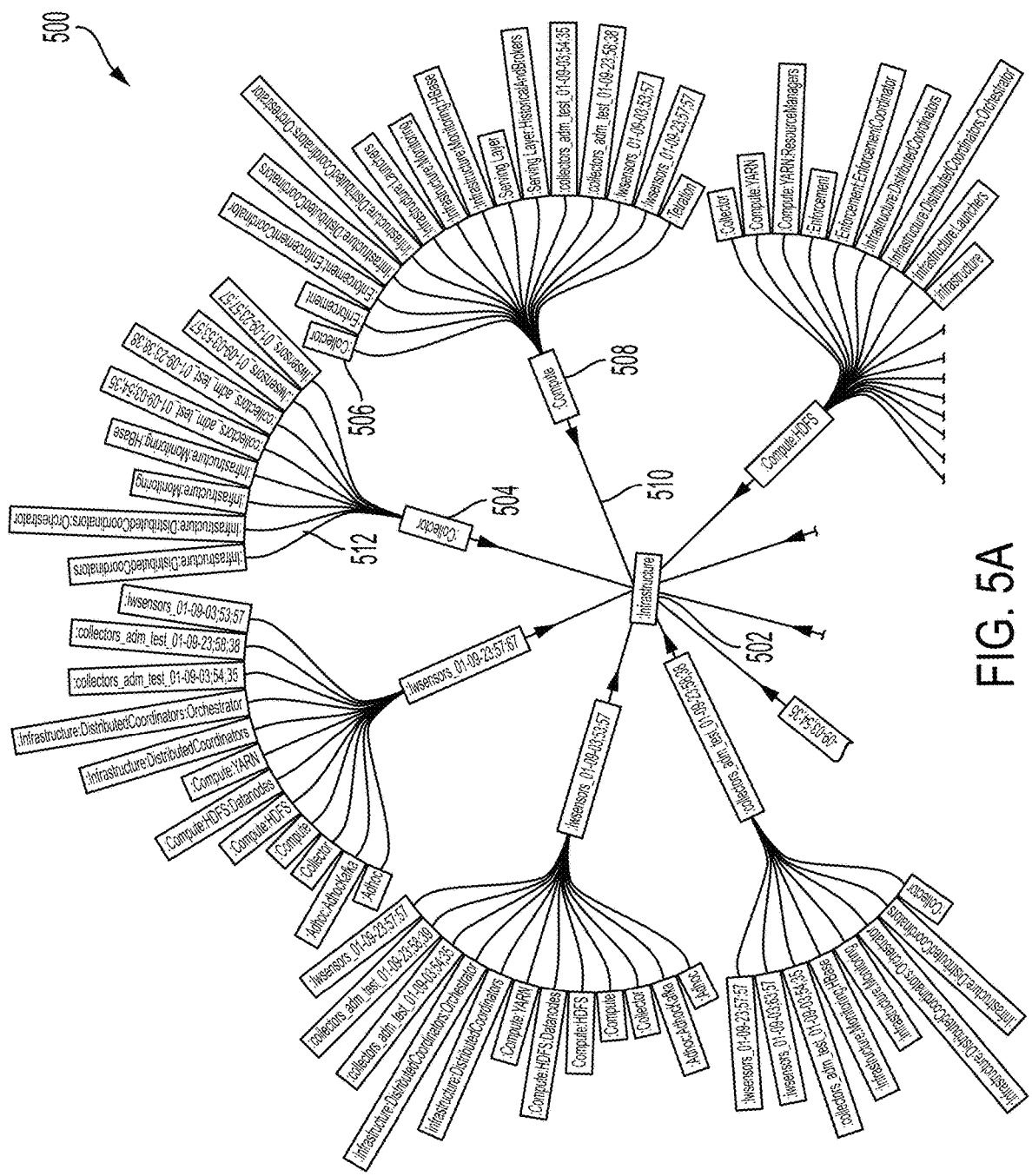
FIG. 5A illustrates an example neighborhood graph, according to one aspect of the present disclosure.

FIG. 5A illustrates an example neighborhood graph, according to one aspect of the present disclosure. Neighborhood graph 500 is a partial example of a full neighborhood graph for the ease of illustration. A neighborhood graph should not be limited to the number of hops, nodes, and shapes of the graph as shown by example neighborhood graph 500 and can be adjusted to reflect any desired number of hops, nodes and can be presented using various types of shapes. Such neighborhood graph 500 can be determined by the analytics engine 110 of FIG. 1, implementing functionalities of neighborhood graph service 330 as described above with reference to FIG. 4.

Example neighborhood graph 500 includes a center node 502, other nodes 504, 506, 508, and hops 510, 512. The center node 502 may be selected by a system operator via a request as described with reference to S402 of FIG. 4. In this example, each of the center node 502 named as "infrastructure," node 504 named as "collector," node 506 named as "collector", and node 508 named as "compute" is presented using a box with the name of the corresponding node. In this inbound neighborhood graph 500, nodes 504 and 508 can be considered inbound neighbors of the center node 502 because there is only one hop between each of nodes 504, 508, and center node 502. Hops, such as hop 510, represent direct network connections between nodes. Each hop is presented as a line that connects two neighboring nodes, and includes an arrow indicating the direction of traffic between the neighboring nodes. In this example, neighborhood graph 500 is an inbound neighborhood graph, so all the arrows on the hops 510 and 512 are pointing to the center node 502 indicating that the traffic is going to the center node 502.

In this example neighborhood graph 500, the number of hops between the center node 502 and other nodes may be selected as smaller or equal to two via a request as described with reference to S402 of FIG. 4. Nodes 504 and 506 represent the same node named "collector." There are two hops between node 506 and the center node 502, whereas there is only one hop between node 504 and the center node 502. This is due to the center node 502 "infrastructure" and node 504/506 "collector" having multiple paths/connections between them with one being a direct connection (one hop between center node 502 and node 504) and the other being an indirect connection (center node 502 being indirectly connected to node 506 via node 508).

Figure 5B:
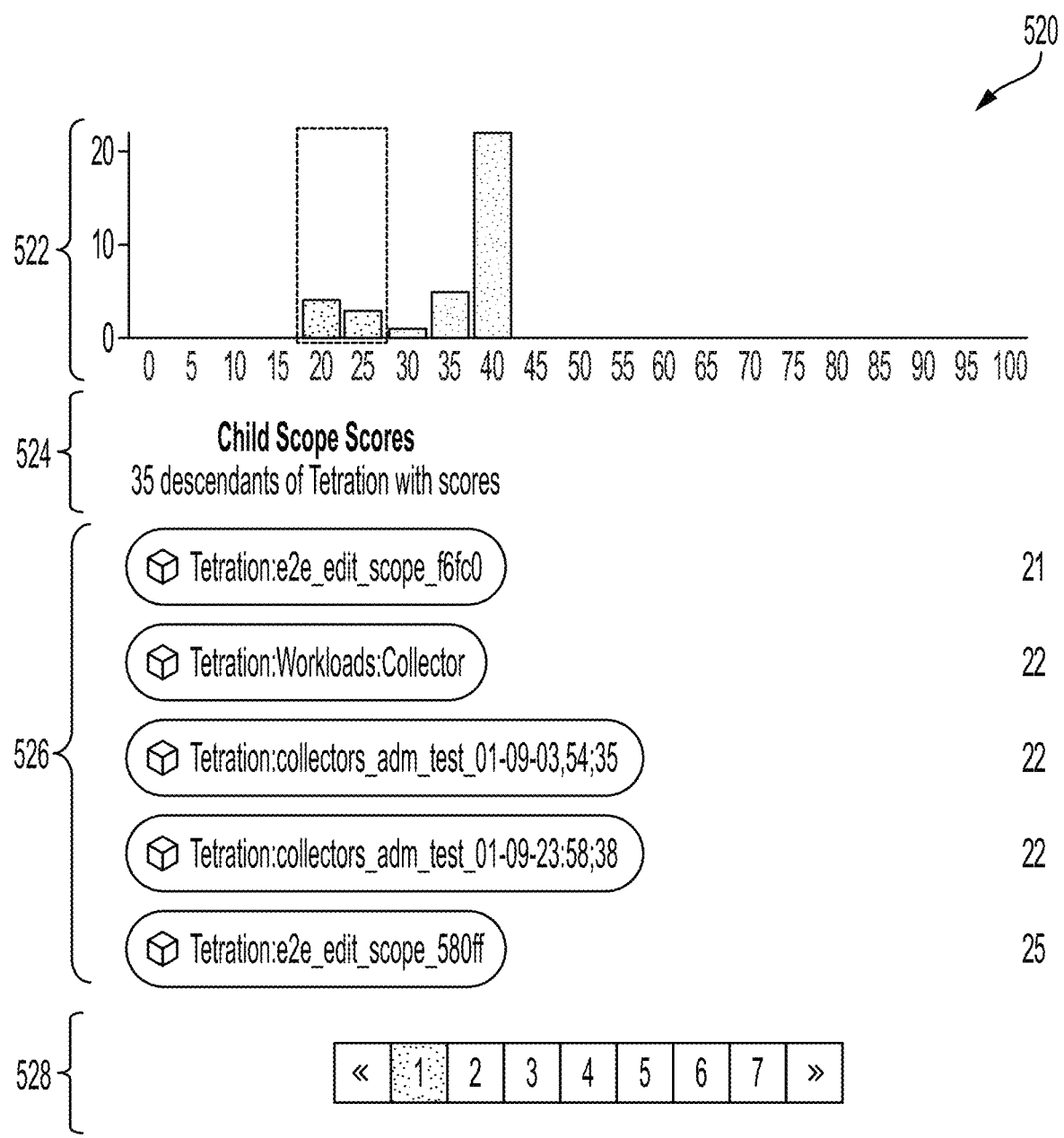
FIG. 5B illustrates an example user interface showing security score of each node within a neighborhood, according to one aspect of the present disclosure.

FIG. 5B illustrates an example user interface showing the security score of each node within a neighborhood, according to one aspect of the present disclosure. In one example, analytics engine 110 may implement functionalities of security score service 320 to determine the security scores as described with reference to FIG. 3. In one example, determine security scores of different network nodes can take into consideration various security factors as described with reference to S406 of FIG. 4.

User interface 520 includes a chart section 522, an overall information section 524, a detail list section 526, and page navigation menu 528. Chart section 522 presents all the nodes within a network neighborhood in groups defined by their individual security scores. The x-axis of chart section 522 present the scale of security scores in 5 points ranges from 0 to 100 (this scale is exemplary and non-limiting. Alternatively, the scale can be 0-10, 0-50 or any other range). The y-axis of chart section 522 presents the number of nodes within each of the ranges. For example, there are four nodes in this neighborhood with a security score in the range of 17-22, three nodes in the range of 23-27, etc.

Overall information section 524 presents the overall information of the neighborhood regarding the security scores. In this example, the information is presented as "Child scope scores, 35 descendants of Tetration with scores." Accordingly, the detail list section 526 presents the thirty-five neighboring nodes of the node named "Tetration," and their corresponding security scores. Detailed list section 526 only illustrates the first 5 nodes but the remaining 30 nodes and their security scores may be viewed by navigating to subsequent pages via page navigation menu 528 described below. The thirty-five neighboring nodes of the node "Tetration" are considered as child nodes of node "Tetration." Child nodes of a given node can be defined as neighboring nodes that are connected on the given node in the traffic direction away from the center node. For example, the nodes connected to node 504 by hops 512 in FIG. 5A can be considered as child nodes of node 504.

Detail list section 526 lists all the nodes and their security scores as indicated in the overall information section 524. For example, the node named "Tetration: Workloads: Collector" has an individual security score of twenty-two.

Page navigation menu 528 presents page numbers of the list of nodes. By clicking on different page numbers, a system operator can view different nodes within the network neighborhood and their corresponding security scores.

Figure 5C:
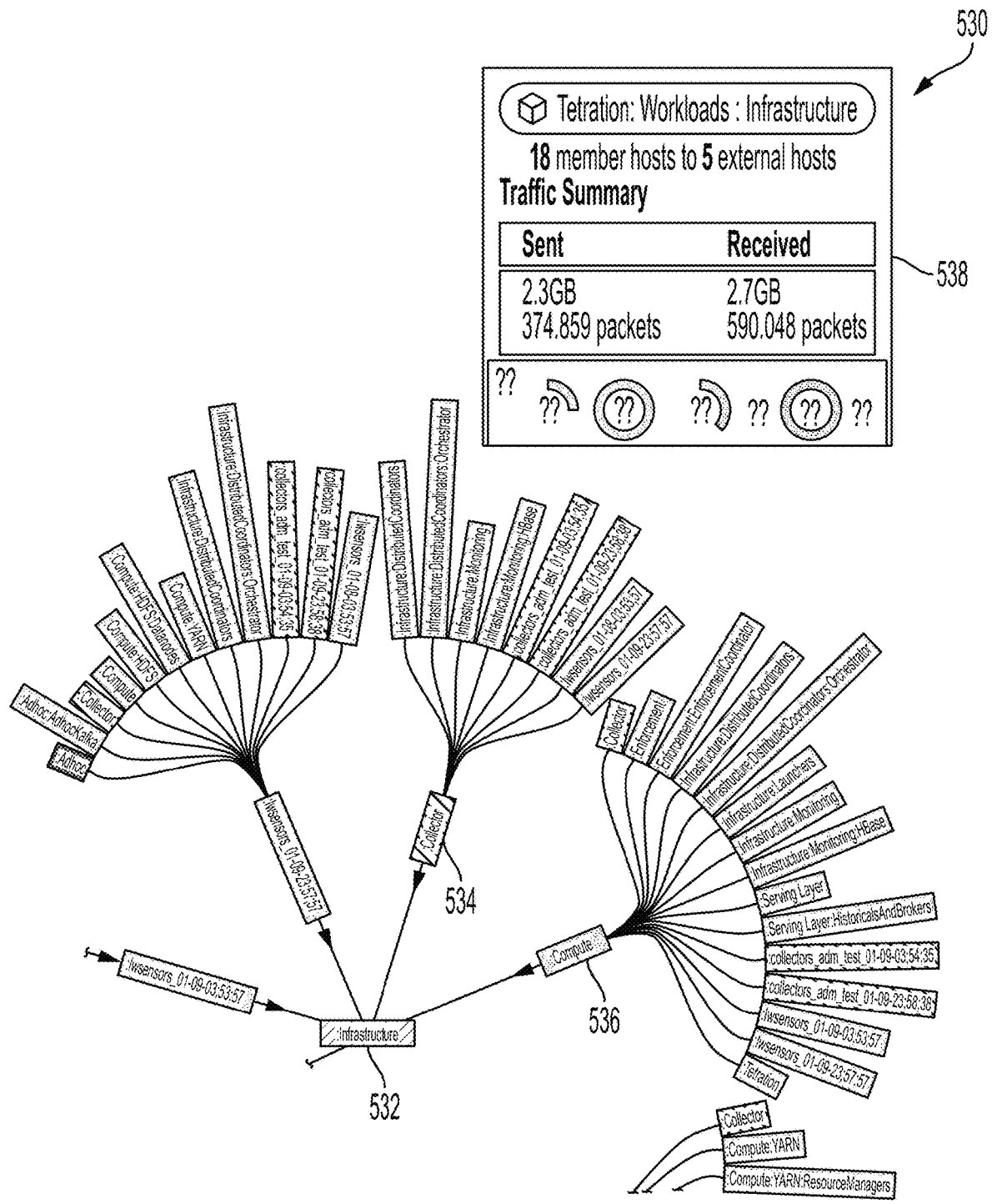
FIG. 5C illustrates an example updated neighborhood graph using the security score of each node, according to one aspect of the present disclosure.

FIG. 5C illustrates an example updated neighborhood graph using the security score of each node, according to one aspect of the present disclosure. The example updated neighborhood graph 530 can be based on neighborhood graph 500 as shown in FIG. 5A. The updated neighborhood graph 530 is a partial view of a full neighborhood graph for ease of illustration. An updated neighborhood graph should not be limited to the number of hops, nodes, and shapes of the graph as shown by example neighborhood graph 530 and can be modified to reflect any number of hopes, nodes and be presented in various other forms or shapes. Such an updated neighborhood graph 530 can be generated by the analytics engine 110 of FIG. 1, implementing functionalities of neighborhood graph service 330. In one example, analytics engine 110 may implement functionalities of security score service 320 to determine the security scores as described with reference to FIG. 3. In one example, this security score can consider different security factors of the node as described with reference to S406 of FIG. 4.

Example updated neighborhood graph 500 includes a center node 532, other nodes 534, 536, and menu 538. The center node 502 may be selected by a system operator via a request as described with reference to S402 of FIG. 4. In this updated neighborhood graph 530, analytics engine 110 can present each node with different colors based on their individual security scores. In this example, each node presented using a first color (or pattern or shade or number, etc.), such as node 536 named "compute," has a security score within the range of 67-100. Each node presented using a second color (or pattern or shade or number, etc.), such as node 532 named "infrastructure," has a security score within the range of 34-66. Each node presented using a third color (or pattern or shade or number, etc.), such as node 534 named as "collector," has a security score within the range of 0-33. Such ranges of scores can be selected by a system operator. More colors or visually differentiating indicators may be selected to present more security score ranges. The menu 538 presents relevant information about network neighborhood of graph 530. For example, menu 538 may include information such as the number of internal hosts (nodes) of the network, number of external hosts (nodes) connected to the network, traffic data, and detailed breakdown of the security scores of the nodes within the neighborhood.

An additional alert function can also be visually presented in the menu 538. The system operator can select the type of alert to be presented, and the analytics engine 110 can create an alert accordingly. For example, the analytics engine 110 can create an alert for any new network connections to the neighborhood having a threshold security score. The threshold security score can be set as a range or a specific score depending on the specific need of the enterprise network. For example, a system operator can set an alert for any new network connections added to the neighborhood having a security score between 0-60. For another example, a system operator can set an alert for any new network connections added to the neighborhood having a security score between 0-30.

The aggregated visual representation of the neighborhood in the updated neighborhood graph 500 improves the security assessment in an enterprise network. Specifically, the visual representation shows either inbound or outbound traffic of the neighborhood overview based on the network connection relationships between each node. Moreover, the visual representation also presents the securities of the nodes relative to each other. Thus, it is straightforward for system operators to identify security issues related to a given node.

Figure 5D:
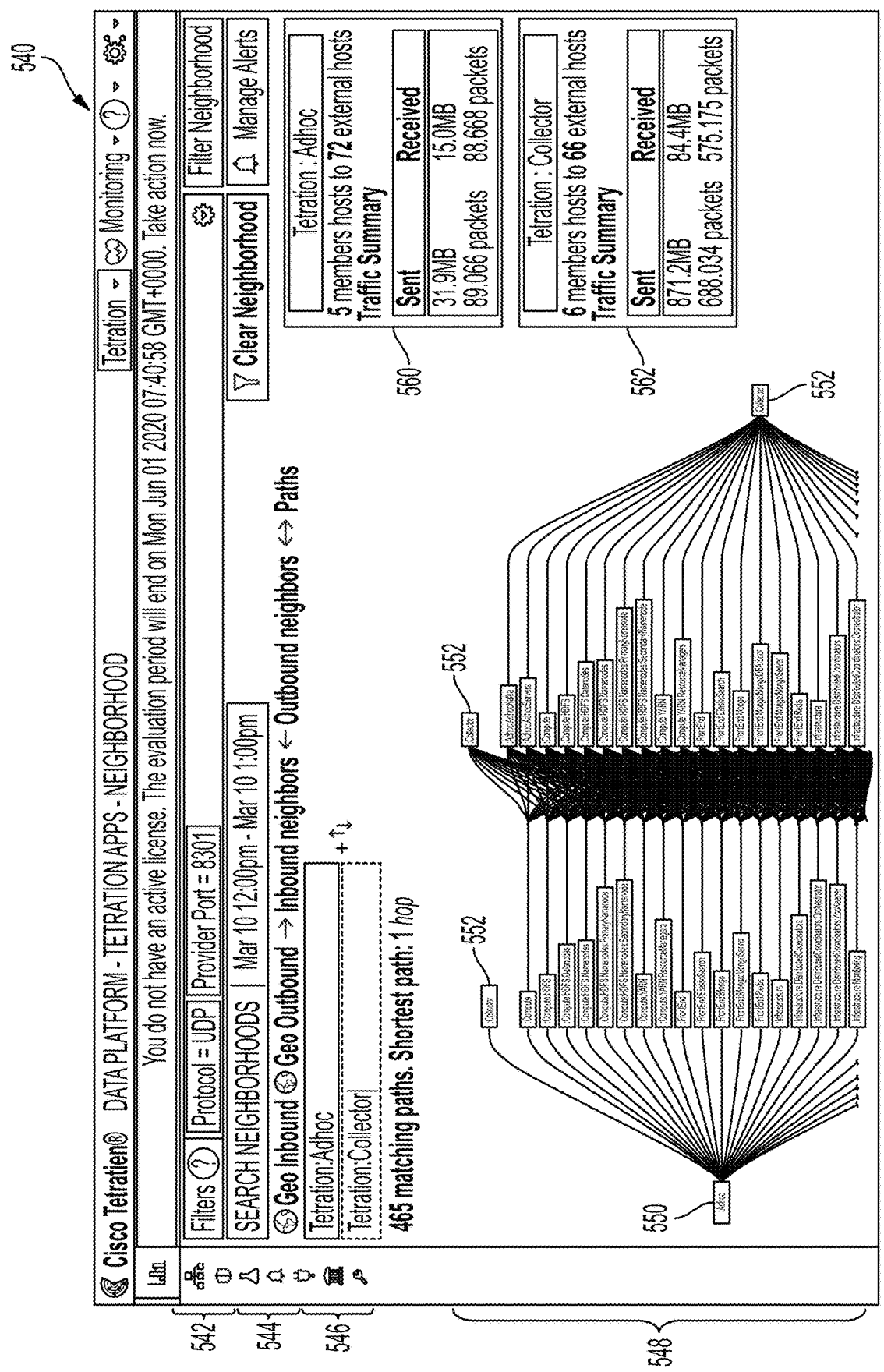
FIG. 5D illustrates an example user interface for filtering a neighborhood graph, according to one aspect of the present disclosure.

FIG. 5D illustrates an example user interface for filtering a neighborhood graph, according to one aspect of the present disclosure. In one example, the example updated neighborhood graph 530 for filtering can be based on example neighborhood graph 500 as shown in FIG. 5A. After filtering, the updated neighborhood graph 530 is a partial example of a full neighborhood graph for the ease of illustration. A filtered and updated neighborhood graph should not be limited to the number of hops, nodes, and shapes of the graph as shown by example neighborhood graph 530. Such an updated neighborhood graph 530 after filtering can be determined by the analytics engine 110 of FIG. 1, implementing functionalities of neighborhood graph service 330.

The user interface 540 includes a filters input section 542, a search function section 544, a node search input section 546, a graph section 548, source node security data section 550, and destination node security data section 552. A system operator may enter any desirable filtering parameter in the filters input section 542. The filtering parameters are designed to help the system operator to narrow down the updated neighborhood graph 530 shown in FIG. 5C for purposes of, for example, focusing on a smaller and more detailed portion of the updated neighborhood graph. The filtering parameter may include, but is not limited to, a parameter to filter a neighborhood based on one source or destination node, a parameter to filter a neighborhood based on a number of source nodes, a parameter to filter a neighborhood based on a number of destination nodes in a neighborhood within the enterprise network, etc.

More specific examples of filtering parameters include, but are not limited to, a filtering parameter to specify types of communication protocol adopted by the nodes, such as the User Datagram Protocol (UDP) shown as "Protocol=UDP" in filters input section 542, a filtering parameter to specify the number of the port (i.e. node) which the system operator is searching for, such as the number 8301 shown as "Provider Port=8301" in filters input section 542, a filtering parameter to specify a threshold security score of a number of source nodes and/or a number of destination nodes, etc. Such a threshold security score can be generated by the analytics engine 110 of FIG. 1, implementing functionalities of anyone or any combination of the vulnerability score service 302, process hash score service 304, attack surface score service 306, forensics score service 308, network anomaly score service 310, segmentation compliance score service 312, security score service 320 described with reference to FIG. 3. Another example filtering parameter specifies the number of hops between the source node and the destination node, such as three hops as shown in the detailed updated neighborhood graph in the graph section 548.

A system operator can further search within an updated neighborhood graph in the search function section 544. This search can narrow down an existing updated neighborhood graph, such as the updated neighborhood graph 530 shown in FIG. 5C. Such detailed search criteria include at least geo inbound, geo outbound, inbound neighbors, outbound neighbors, and paths as shown in search function section 544. For example, geo inbound or geo outbound can be selected to search either inbound traffic only or outbound traffic only based on an existing updated neighborhood graph 530. For another example, inbound neighbors or outbound neighbors can be selected to search either inbound traffic neighbors only or outbound traffic neighbors only of a source node. For yet another example, paths can be selected to filter an existing updated neighborhood graph based on a number of source nodes and a number of destination nodes.

After the system operator selects paths, an existing updated neighborhood graph 530 can be filtered. Specifically, as shown in a node search input section 546, an existing updated neighborhood graph, such as updated neighborhood graph 530, can be filtered to show a detailed updated neighborhood graph between source node "Tetration: Adhoc" and a destination node "Tetration: Collector."

A system operator may select the plus sign on the right of the search function section 544 to add more source node or destination node to filter the detailed updated neighborhood graph. A system operator may also select the switch sign on the right of the plus sign to switch the order of the source node/nodes and the destination node/nodes.

After the system operator inputs the filtering parameter in filters input section 542, selects the detailed search criteria in the search function section 544, a filtered neighborhood graph can be presented based on an existing updated neighborhood graph, such as an updated neighborhood graph 530. Section 548 illustrates an example filtered neighborhood graph based on filtered parameters entered using UI 540 as described above. Specifically, example filtered graph of section 548 illustrates connections between source node 550 "Tetration: Adhoc" and a destination node 552 "Tetration: Collector" per filter parameters. Destination node 552 "Tetration: Collector" is presented a few times depending on how the destination node 552 is connected to the source node 550 in the neighborhood. In this example, destination node 552 is connected to the source node 550 in the neighborhood directly, through one node, or through two nodes.

In addition to the graph section 548, the analytics engine 110 may also present detailed security data in the source node security data section 560 and the destination node security data section 562. For example, the source node security data section 560 presents a number of internal and external nodes connected to the source node 550, and statistics related to traffic data sent and received through the source node 550 such as size of the traffic, number of data packets sent and received, etc.

The detailed visual representation of the neighborhood graph in section 548 and the additional security data shown in the source node security data section 560 and the destination node security data section 562, a system operator can receive a more in depth and detailed insight into the network configuration and connections, which in turn enables a faster and more efficient mechanism for detecting anomalies and network security issues that should be addressed in a timely manner.

With various examples of generating visual representation of network neighborhoods described above with reference to FIGS. 1-5, the disclosure now turns to description of devices and system architectures that can be used as various components of network monitoring system of FIG. 1 (e.g., as analytics engine 110), various components of network environment 200, etc.

Figure 6A:
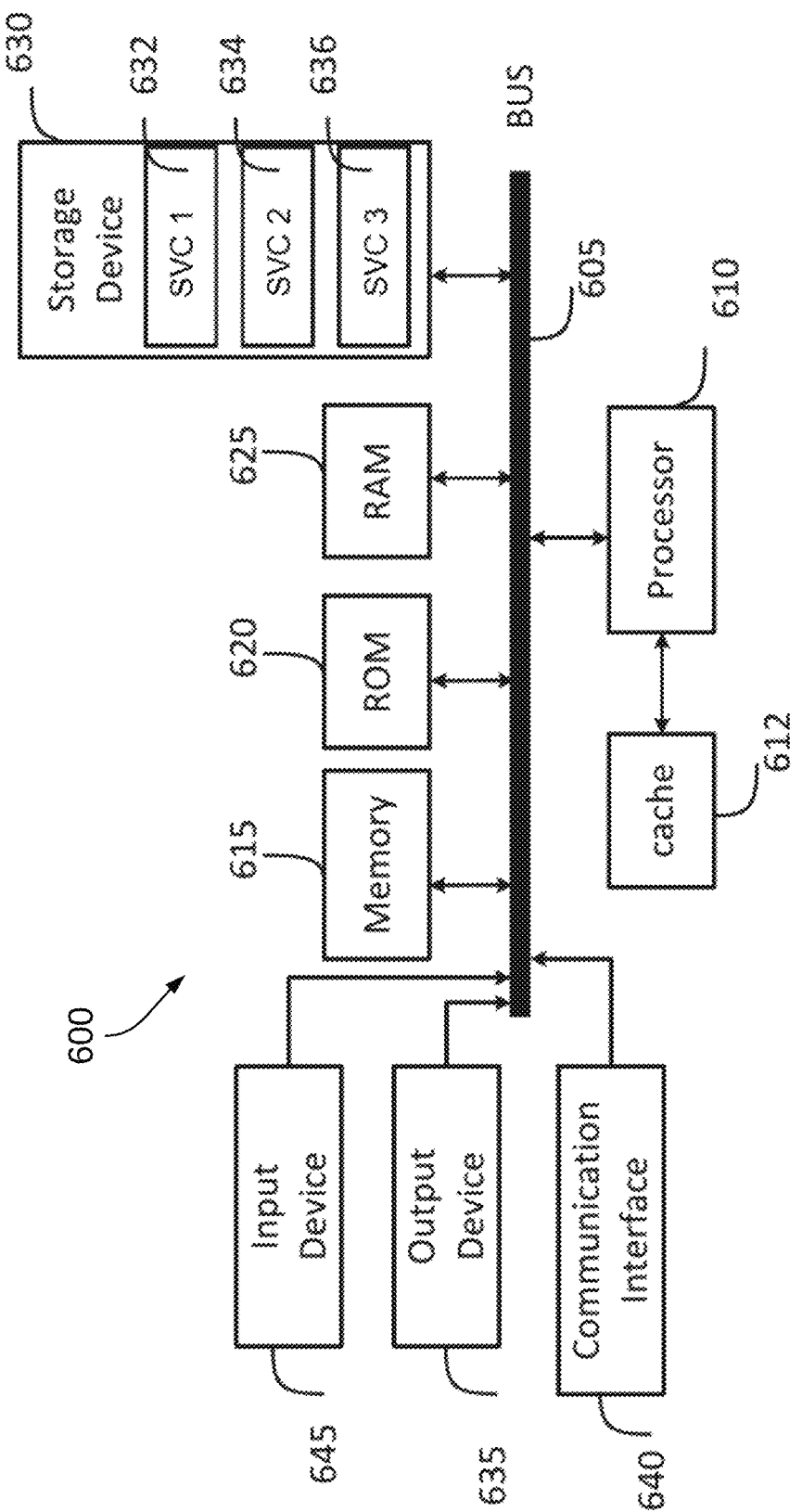
FIGS. 6A and 6B illustrate examples of systems, according to one aspect of the present disclosure.
Figure 6B:
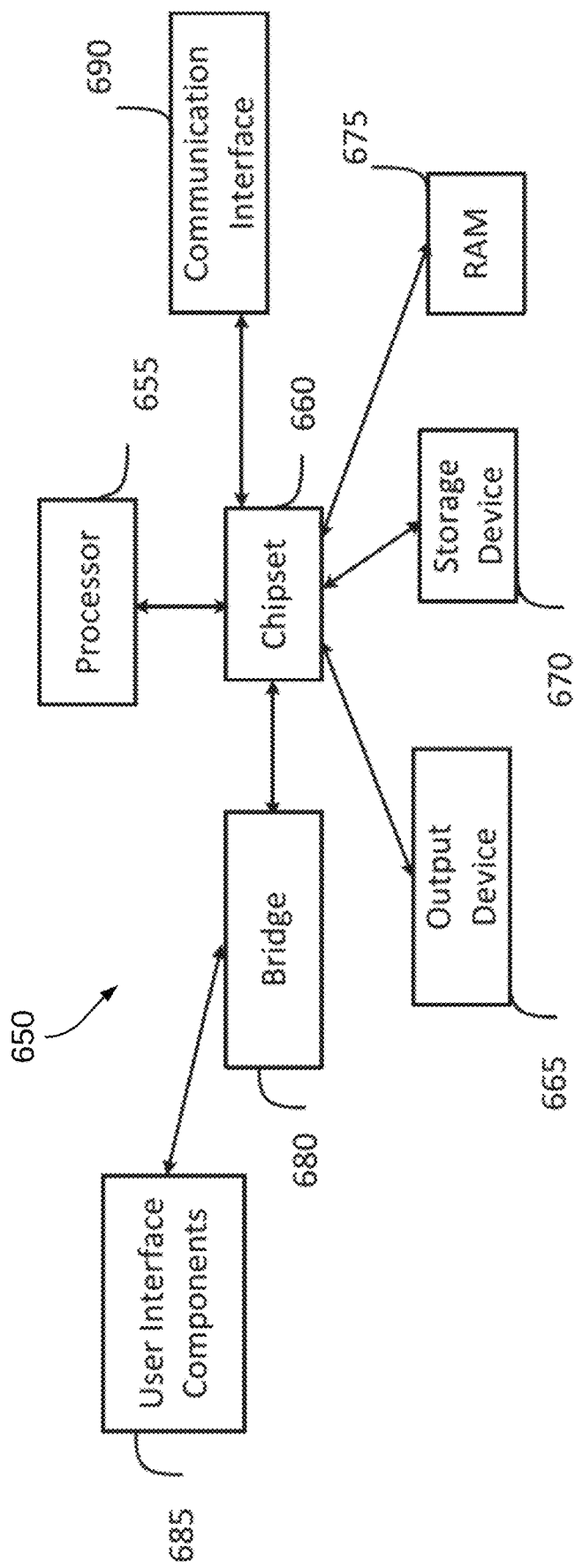

FIG. 6A and FIG. 6B illustrate examples of systems, according to one aspect of the present disclosure. The more appropriate system will be apparent to those of ordinary skill in the art when practicing the various embodiments. Persons of ordinary skill in the art will also readily appreciate that other systems are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read-only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general-purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 680, and hybrids thereof.

The storage device 630 can include software modules 638, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human-generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655. It can be appreciated that example systems 600 and 650 can have more than one processor 610 or be part of a group or cluster of computing devices networked together to provide greater processing capability.

It will be appreciated that computing systems 500 and 550 can have more than one processor 510 and 555, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
generating a neighborhood graph for a plurality of nodes in an enterprise network, the neighborhood graph representing a multi-hop connection between any two nodes of the plurality of nodes;
determining a plurality of sub-scores for each of the plurality of nodes, each of the plurality of sub-scores being indicative of a different security aspect of a corresponding one of the plurality of nodes, the plurality of sub-scores including at least a corresponding vulnerability score and a corresponding attack surface score for each of the plurality of nodes;
determining, based on the plurality of sub-scores, an overall security score for each of the plurality of nodes to yield a plurality of scores; and
updating the neighborhood graph of the plurality of nodes using the plurality of scores to provide a visual representation of securities of the plurality of nodes relative to each other.

2. The method of claim 1, wherein the plurality of sub-scores further include a corresponding process hash score, a corresponding forensics score, a corresponding network anomaly score, and a corresponding segmentation compliance score for each of the plurality of nodes.

3. The method of claim 1, further comprising:
filtering the updated neighborhood graph.

4. The method of claim 3, wherein the filtering is based on a filtering parameter associated with at least one of a number of source nodes and a number of destination nodes in the enterprise network.

5. The method of claim 4, wherein the filtering parameter includes a threshold attack surface score of each of the number of source nodes, a threshold attack surface score of each of the number of destination nodes, a vulnerability score of each of the number of source nodes, or a vulnerability score of each of the number of destination nodes.

6. The method of claim 1, further comprising:
receiving a request for generating the neighborhood graph.

7. The method of claim 1, further comprising:
creating an alert for the updated neighborhood graph, the alert indicating presence of one or more new network connections between the plurality of nodes having a threshold security score.

8. A network controller comprising:
one or more memories computer-readable instructions; and one or more processors configured to execute the computer-readable instructions to:
generate a neighborhood graph for a plurality of nodes in an enterprise network, the neighborhood graph representing a multi-hop connection between any two nodes of the plurality of nodes;
determine a plurality of sub-scores for each of the plurality of nodes, each of the plurality of sub-scores being indicative of a different security aspect of a corresponding one of the plurality of nodes, the plurality of sub-scores including at least a corresponding vulnerability score and a corresponding attack surface score for each of the plurality of nodes;
determine, based on the plurality of sub-scores, an overall security score for each of the plurality of nodes to yield a plurality of scores; and
update the neighborhood graph of the plurality of nodes using the plurality of scores to provide a visual representation of securities of the plurality of nodes relative to each other.

9. The network controller of claim 8, wherein the plurality of sub-scores further include a corresponding process hash score, a corresponding forensics score, a corresponding network anomaly score, and a corresponding segmentation compliance score for each of the plurality of nodes.

10. The network controller of claim 8, wherein the one or more processors are further configured to execute the computer-readable instructions to filter the updated neighborhood graph.

11. The network controller of claim 10, wherein the one or more processors are further configured to execute the computer-readable instructions to filter the updated neighborhood graph based on a filtering parameter associated with at least one of a number of source nodes and a number of destination nodes in the enterprise network.

12. The network controller of claim 11, wherein the filtering parameter includes a threshold attack surface score of each of the number of source nodes, a threshold attack surface score of each of the number of destination nodes, a vulnerability score of each of the number of source nodes, or a vulnerability score of each of the number of destination nodes.

13. The network controller of claim 8, wherein the one or more processors are further configured to execute the computer-readable instructions to receive a request for generating the neighborhood graph.

14. The network controller of claim 8, wherein the one or more processors are further configured to execute the computer-readable instructions to create an alert for the updated neighborhood graph, the alert indicating presence of one or more new network connections between the plurality of nodes having a threshold security score.

15. One or more non-transitory computer-readable media comprising computer-readable instructions, which when executed by one or more processors of a network controller, cause the network controller to:
generate a neighborhood graph for a plurality of nodes in an enterprise network, the neighborhood graph representing a multi-hop connection between any two nodes of the plurality of nodes;
determine a plurality of sub-scores for each of the plurality of nodes, each of the plurality of sub-scores being indicative of a different security aspect of a corresponding one of the plurality of nodes, the plurality of sub-scores including at least a corresponding vulnerability score and a corresponding attack surface score for each of the plurality of nodes;
determine, based on the plurality of sub-scores, an overall security score for each of the plurality of nodes to yield a plurality of scores; and
update the neighborhood graph of the plurality of nodes using the plurality of scores to provide a visual representation of securities of the plurality of nodes relative to each other.

16. The one or more non-transitory computer-readable media of claim 15, wherein the plurality of sub-scores further include a corresponding process hash score, a corresponding forensics score, a corresponding network anomaly score, and a corresponding segmentation compliance score for each of the plurality of nodes.

17. The one or more non-transitory computer-readable media of claim 15, wherein the execution of the computer-readable instructions cause the network controller to filter the updated neighborhood graph.

18. The one or more non-transitory computer-readable media of claim 17, wherein the execution of the computer-readable instructions cause the network controller to filter the updated neighborhood graph based on a filtering parameter associated with at least one of a number of source nodes and a number of destination nodes in the enterprise network.

19. The one or more non-transitory computer-readable media of claim 18, wherein the filtering parameter includes a threshold attack surface score of each of the number of source nodes, a threshold attack surface score of each of the number of destination nodes, a
vulnerability score of each of the number of source nodes, or a vulnerability score of each of the number of destination nodes.

20. The one or more non-transitory computer-readable media of claim 17, wherein the execution of the computer-readable instructions cause the network controller to create an alert for the updated neighborhood graph, the alert indicating presence of one or more new network connections between the plurality of nodes having a threshold security score.

* * * * *